F. A. LANE.
DEMOUNTABLE RIM.
APPLICATION FILED JULY 13, 1920.
1,409,734.
Patented Mar. 14, 1922.
2 SHEETS—SHEET 1.
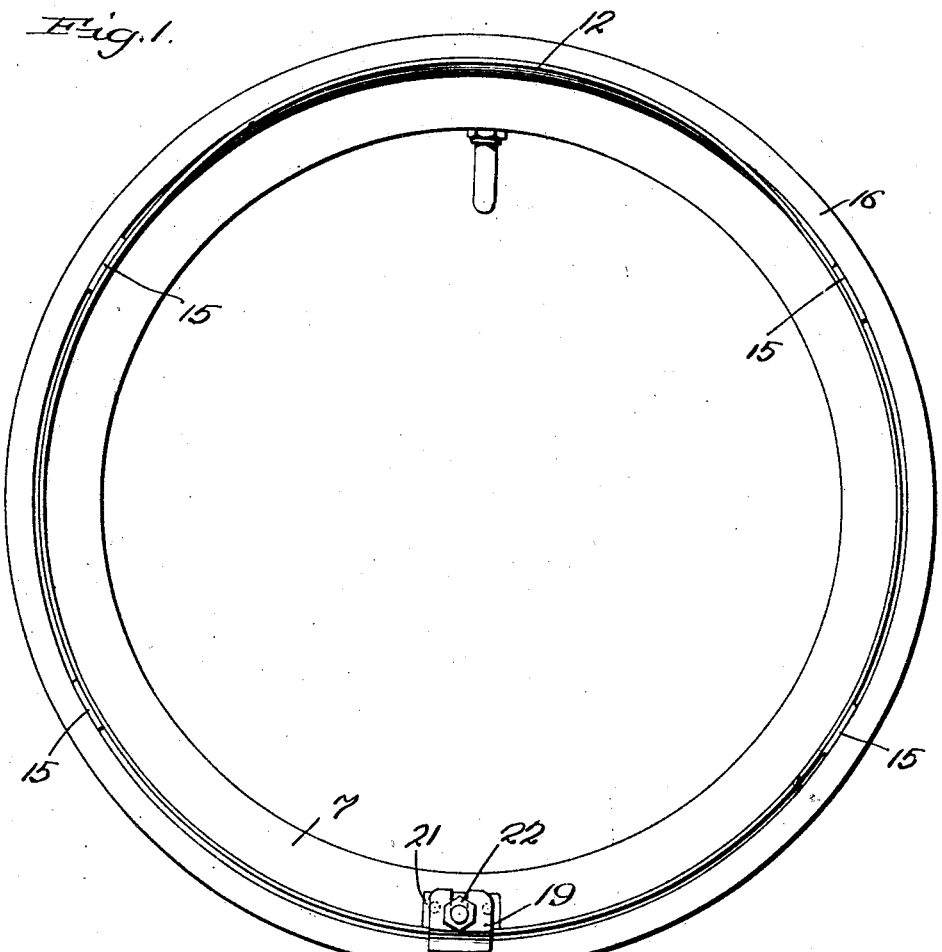
Fig. 1.
Fig. 2.
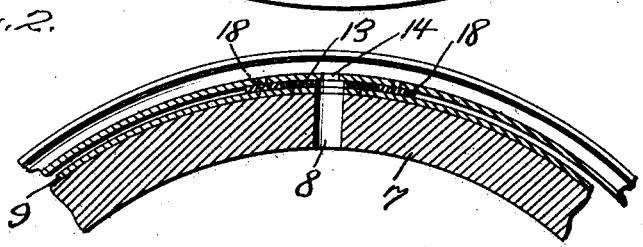
WITNESSES
Fred A. Lane, INVENTOR.
BY
Richard B. Owen, ATTORNEY.

F. A. LANE.
DEMOUNTABLE RIM.
APPLICATION FILED JULY 13, 1920.

1,409,734.

Patented Mar. 14, 1922.
2 SHEETS—SHEET 2.

WITNESSES
Gerald Hennessy
B. F. Garvey

Fred A. Lane
INVENTOR.

BY
Richard B. Owen,
ATTORNEY.

UNITED STATES PATENT OFFICE.

FRED A. LANE, OF SHELBURN, INDIANA.

DEMOUNTABLE RIM.

1,409,734.

Specification of Letters Patent.

Patented Mar. 14, 1922.

Application filed July 13, 1920. Serial No. 395,825.

*To all whom it may concern:*

Be it known that I, FRED A. LANE, citizen of the United States, residing at Shelburn, in the county of Sullivan and State of Indiana, have invented certain new and useful Improvements in Demountable Rims, of which the following is a specification.

This invention relates to demountable rims for vehicle wheels.

The principal object of the invention is to produce a simplified structure which permits a quick change of the tire, thereby greatly saving both time and labor involved in this work.

A coordinate object of the invention is to provide an efficient device which is practical in every detail and is adaptable for use with standard wheels and tires.

A further object consists in the use of a single locking means for the tire carrying rim, whereby release of this single means permits immediate removal of the tire rim.

The above and other objects of this invention will be in part described and in part understood from the following description of the present preferred embodiment of the invention, wherein:

Fig. 1, is a side elevational view of a wheel felly embodying a demountable rim structure made in accordance with my invention.

Fig. 2, is a fragmentary detail vertical sectional view of the wheel felly and associated rims showing to advantage the tire valve opening.

Figure 3:
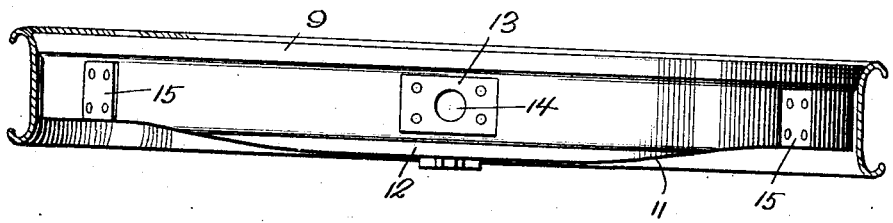
Fig. 3, is a plan view of the felly rim.
Figure 4:
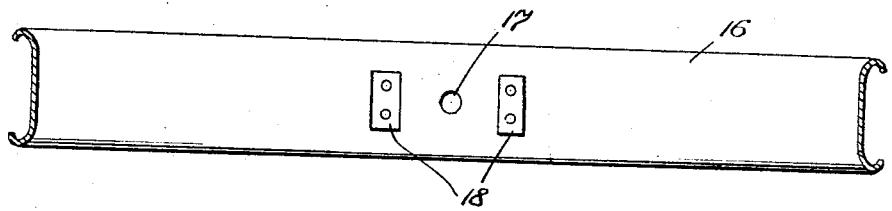
Fig. 4, is a cross sectional view of the tire rim, showing to advantage the locking lugs.
Figure 5:
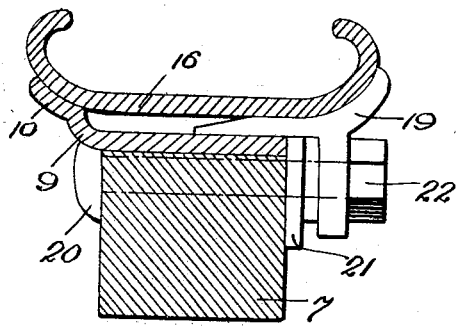
Fig. 5, is a transverse sectional view of the felly, felly rim and tire rim showing the locking wedge associated therewith, the latter being shown in side elevation.

In the drawings a felly 7 of conventional type is illustrated which is provided with a tire valve opening 8.

Figure 6:
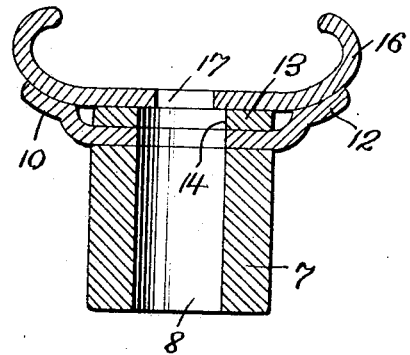
Fig. 6, is a similar view taken through the tire valve opening.

A felly rim 9 is mounted upon the outer periphery of said felly 7 and is fixedly secured thereto. The inner margin of said rim is bent upwardly to provide a flange 10. A portion of the front margin of said rim is extended as indicated at 11 and curled upwardly to provide a locking lip as indicated at 12 and shown to advantage in Figs. 1 and 3. It will be noted that the opposite ends of the lip gradually taper and issue into the felly rim. The widest portion of said lip is preferably arranged coincident with a line drawn transversely across the felly intersecting the valve opening 8. Upon reference to Fig. 6 of the drawings it will be noted that the lip 12 lies parallel with the flange 10.

A plate 13 is fixedly secured to the outer periphery of said felly rim and is provided with an opening 14 which registers with the opening 8 in the felly 7. Additional plates 15 are arranged at intervals on said felly rim and serve as spacers in a manner which will be subsequently obvious.

A tire rim 16 of substantially conventional design is used which is provided with a tire valve opening 17 aligning with the openings 8 and 14 in the felly and felly rim respectively. Locking lugs 18 are arranged on opposite sides of the opening 17 and appreciably spaced therefrom. These lugs are adapted for snug engagement with the terminals of the plate 13 when the tire rim is slipped upon the felly rim. In this way relative circumferential movement of said rims will be prevented.

To retain the tire rim on the felly rim a locking wedge 19 is provided, the wedge shaped end of which is interposed between the tire rim and felly rim. A bolt 20 extends through the felly 7 adjacent the felly rim and passes through a wear plate 21 which is secured to the outer face of the felly. The bolt continues through said plate 21 and engages the wedge shaped lock 19, the bolt being held in the usual way by a nut 22.

In use of the device, the tire rim is first engaged with the felly by inserting the tire valve through the openings 14, 17, and 8. The tire and rim are permitted to gravitate downwardly until the upper inner periphery of the tire rim engages the upper outer periphery of the felly rim. At this point lateral displacement of the tire rim will be prevented because of the flange 10 on one side and the locking lip 12 on the opposite side. The locking wedge 19 is arranged on the felly 7 at a point diametrically opposite to the locking lip 12, thereby preventing accidental displacement of the tire rim from the felly rim at any point on the latter. However, it is understood that when the tire is to be removed it is necessary to disengage only the single nut 22, permitting withdrawal of the locking wedge 19, thereby permitting the tire and tire rim to be slipped from the felly rim at this point, pursuant to which pressure is exerted upon the tire to force the same beyond the upper margin of the flange 10 and lip 12, permitting the tire valve to be withdrawn through the valve openings.

It will be obvious therefore that the tire rim is locked in place by the use of a single nut and bolt, and consequently removal of the tire is permitted by the removal of only the one nut thereby greatly expediting changing tires.

It is to be understood that I have above described only the preferred form of my invention and changes may be made therein by me within the scope of the appended claims.

What I claim is,

In combination with a wheel felly having a valve stem opening, and rim mounted on said felly, one margin of which is flanged and a portion of the opposite margin gradually extended outwardly and bent upwardly to provide a lip the ends of which taper, the widest point of said lip being parallel with said valve stem opening, a tire rim mounted on the aforesaid rim, and a single means arranged between said rims at a point diametrically opposite to said lip to prevent displacement of the tire rim.

In testimony whereof I affix my signature in presence of two witnesses.

FRED A. LANE.

Witnesses:
H. T. GOAD,
CHAS. A. McCULLOUGH.